(12) United States Patent
Trell

(10) Patent No.: US 6,393,117 B1
(45) Date of Patent: May 21, 2002

(54) TELEPHONING METHOD COMPRISING NOVEL SUBSCRIBER SERVICE

(75) Inventor: Anders Edvard Trell, Stockholm (SE)

(73) Assignee: Anders Trell Trust, Buffalo, NY (US)

( * ) Notice: Subject to any disclaimer, the term of this patent is extended or adjusted under 35 U.S.C. 154(b) by 0 days.

(21) Appl. No.: 09/155,674
(22) PCT Filed: May 24, 1997
(86) PCT No.: PCT/SE97/00858
  § 371 Date: Oct. 2, 1998
  § 102(e) Date: Oct. 2, 1998
(87) PCT Pub. No.: WO97/45988
  PCT Pub. Date: Dec. 4, 1997

(30) Foreign Application Priority Data

May 31, 1996 (SE) .............................. 9602187

(51) Int. Cl.⁷ .......................... H04M 3/42; H04M 7/00; H04M 1/64; H04M 3/00
(52) U.S. Cl. .................... 379/207.1; 379/230; 379/201; 379/220; 379/67; 379/373
(58) Field of Search ................................. 379/201, 204, 379/210, 211, 179, 207, 373, 67

(56) References Cited

U.S. PATENT DOCUMENTS

| | | | |
|---|---|---|---|
| 4,907,256 A | * 3/1990 | Higuchi et al. | 379/137 |
| 4,998,273 A | * 3/1991 | Nichols | 379/102 |
| 5,375,161 A | * 12/1994 | Fuller et al. | 379/57 |
| 5,425,081 A | 6/1995 | Gordon et al. | 379/100 |
| 5,537,657 A | * 7/1996 | King, III | 379/179 |
| 5,590,184 A | 12/1996 | London | 379/142 |
| 5,651,053 A | * 7/1997 | Mitchell | 379/67 |
| 5,706,336 A | * 1/1998 | Kikinis | |
| 5,835,582 A | * 11/1998 | Matsuda et al. | 379/373 |
| 6,181,787 B1 | * 1/2001 | Malik | 379/207 |

FOREIGN PATENT DOCUMENTS

GB 2287852 9/1995
GB WO 96/31043 * 10/1996 ............ 3/38

OTHER PUBLICATIONS

"Telephone News," (Nov. 14, 1988) vol. 9, No. 45, Abstract No. 88:79795 NLDB. "NEC America Signs Letter of Intent to Purchase API Telephones".*

"BOC Week," (Jun. 13, 1988) vol. 5, No. 24, Abstract No. 88:17636 NLDB. "Bell Atlantic Offers '*Identa* * *Ring* 'Service".*

"Communications Week," (May 8, 1989) pp. C10,C14, Abstract No. 89:109110 PROMT. "Bell Atlantic: IQ Services include 'Class' services".*

"Telecom A.M.," (Jan. 23, 1989), Abstract No. 89:14257 NLDB. "New Jersey Bell Files *Identa* *Ring*".*

Patent Abstracts of Japan, vol. 17, No. 411, JP,A,5–76060 (Murata Mach Ltd), Mar. 26, 1993.

* cited by examiner

Primary Examiner—Harry S. Hong
Assistant Examiner—Thjuan P Knowlin
(74) Attorney, Agent, or Firm—Jacobson Holman, PLLC

(57) ABSTRACT

A telephoning method, intended to facilitate possibility to offer subscribers of a telephone network/telecommunication system a novel service for preferably incoming calls/communication. According to the invention, a subscriber can, preferably by means of dial-up and/or input, preferably via an existing keypad at the telephone instrument/terminal of the subscriber, of a predetermined booking number/code be given possibility to state a desired time period for a temporary telephone number/address, the subscriber after completed ordering operation preferably receiving a verbal message related to allocated temporary telephone number/address, which during the time period facilitates preferably incoming calls/communication, preferably without influencing the possibility of incoming and outgoing calls/communication with use of the normal telephone number/address of the subscriber. As time period, the subscriber preferably states starting date and terminating date, and possibility to state time interval within each twenty-four hour period can also be offered.

12 Claims, 3 Drawing Sheets

TELEPHONING METHOD COMPRISING NOVEL SUBSCRIBER SERVICE

BACKGROUND OF THE INVENTION

Field of the Invention

The present invention relates to a telephoning method, intended to facilitate possibility to offer subscribers of a telephone network or similar a novel service, preferably for incoming calls/communication.

On certain occasions one might for example wish to advertise in a magazine with regard to matter when one at the same time wishes to maintain certain anonymity, which here is chosen as a descriptive scenario, although also replying to advertisements, date line recordings etc. are some out of many other applicable situations. Such advertisements may be of the type contact advertisements, search for employment, sales, rental etc., when there are cases when it is unsuitable or not desirable to make it possible to identify the advertiser, something which normally can not be prevented when the ordinary telephone number of the advertiser is stated. At the same time it is in many cases desirable and advantageous if interested parties are given possibility of direct and immediate telephone response, which normally increases the efficiency of an advertisement considerably. For example, with regard to contact advertisements, which often are a sensitive matter for the advertiser and for which anonymity is desirable, today various types of 'contact data bases' are used whereby a forwarding company, normally for a fee, transfer incoming replies by mail or via a pay number (e.g. 071) for a fee gives a calling party ability of recordal of a reply, which may be played back or in any other way passed on to the advertiser. However, this is a complicated, indirect and expensive method, which most certainly prevents many interested parties from replying. There is also a certain risk the mailed or recorded replies may be misused.

SUMMARY OF THE INVENTION

One object of the present invention is to disclose a method which maintains all advantages with an immediate, spontaneous and direct telephone response without interfering with the wish of the advertiser to avoid giving away the identity of the advertiser by stating a telephone number in the advertisement. A further object is to offer this service in a simple and non-complicated manner, and by making use of the latent capacity which is available in a telephone network.

This includes the possibility of offering a subscriber a temporary/occasional "020" number/status and a temporary/occasional priority status/address with regard to "Internet" and similar services.

The telephoning method according to the present invention is intended to facilitate possibility to offer subscribers of a telephone network this novel service for incoming calls, and it is mainly characterized in that a subscriber by means of dial-up of a predetermined booking number is offered possibility to state a desired time period, preferably in the form of a starting date and an ending date for a temporary/occasional telephone number/address (hereinafter referred to as "temporary" telephone number, that the subscriber preferably upon completed ordering operation immediately receives a verbal message related to allocated temporary telephone number, which during the time period facilitates incoming calls, preferably without influencing the possibility of incoming and outgoing calls with use of the normal telephone number of the subscriber. Desired time period is preferably stated by a subscriber as a starting date and a terminating date, preferably by input via an existing keypad on the subscriber's telephone.

The subscriber is advantageously offered, apart from starting date and closing date, possibility to also state time interval within a twenty-four hour period, incoming calls being switched to the temporary telephone number only within such a time interval. Desired time interval is also for this feature preferably punched in via an existing keypad on the subscriber's telephone.

BRIEF DESCRIPTION OF THE DRAWINGS

A non-restricting example of the method according to the present invention, and modifications thereupon, are more fully described below with reference to the accompanying drawings, in which.

DESCRIPTION OF THE INVENTION

An example of a preferred embodiment will now be more fully described with reference to the flow chart shown in FIG. 1. Telephone communication has been chosen as a descriptive example and one condition is that a telephone subscriber intending to use the service according to the present invention is connected to a program controlled telephone exchange, i.e. the type of telephone exchange in which connected subscribers by means of preferably tone signaling from a connected telephone can initiate or disconnect additional services, such as for example wake-up calls, follow-me diversion, three-party conference calls, inquiry/refer back or similar.

According to the invention, a subscriber initiates the service according to the invention by punching in a predetermined connecting code sequence on the keypad of the telephone, e.g. "*44#", which in the flow chart has been denominated as "START". As a result, the subscriber is connected to preferably a speech synthesizing equipment, which initially requests information from which date (year, month and day) as an additional telephone number is desired for incoming calls.

This is punched in by the subscriber from the keypad of the telephone (denominated "YYMMDD#"), i.e. completed input may for example be terminated by the symbol "#". The date punched in is thereafter preferably checked with regard to validity, and on approval a stop date is requested.

Figure 1:
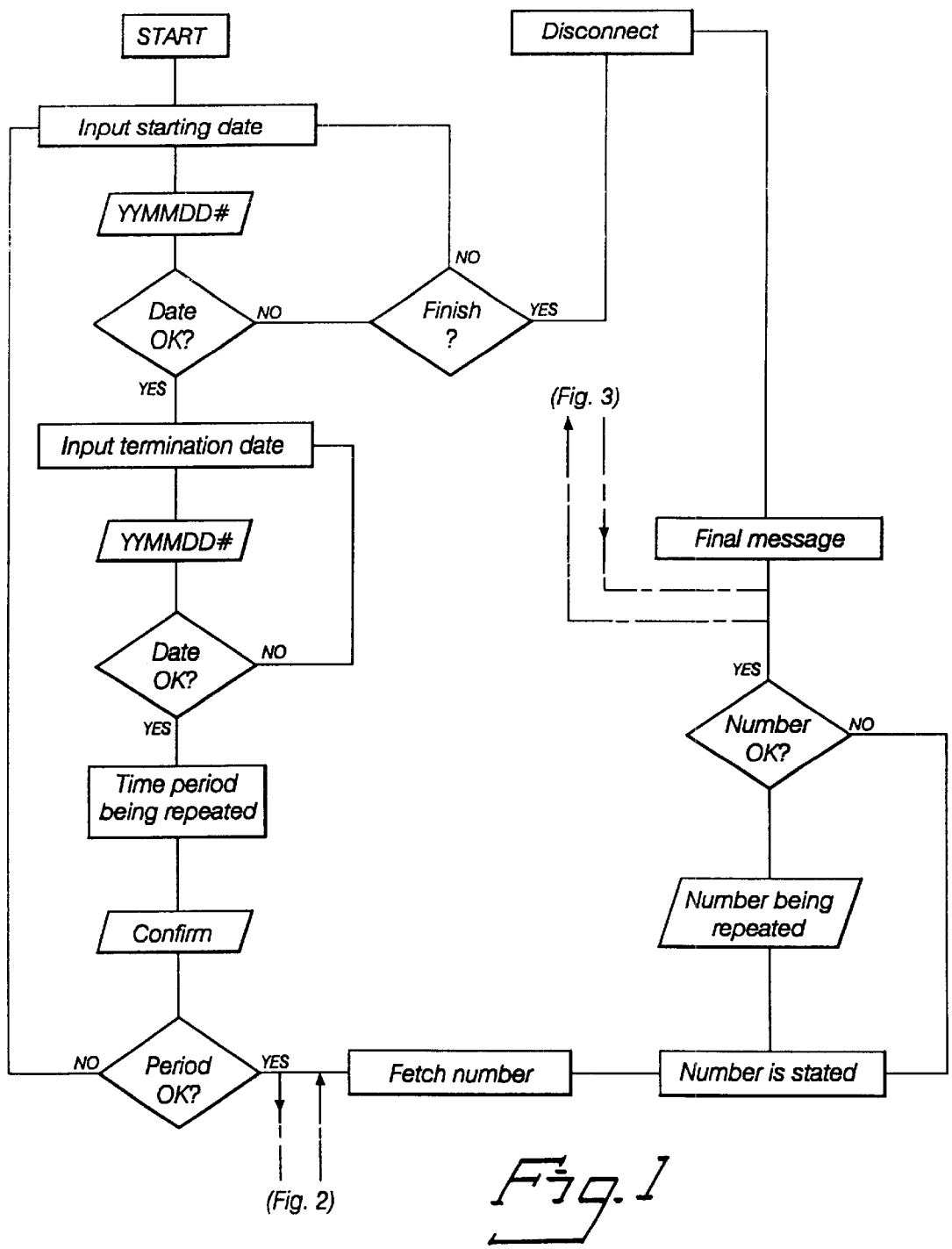
FIG. 1 is a flow chart showing an example of an input programming sequence from a subscriber desiring to obtain a further telephone number for incoming calls.

As shown in FIG. 1, the subscriber may advantageously initially be offered to deny the service, e.g. by inputting another predetermined code sequence indicating "stop", e.g. by only entering "#", i.e. without numerals indicating "YYMMDD". A non-accepted date, or such a finishing code, thus results in the alternative that the subscriber is offered a second possibility of input or that the call is disconnected.

Provided that the start date is accepted, the subscriber receives a verbal message requesting stop date. This date is also checked for validity, and an incorrect date results in a repeated request for a stop date.

When both starting date and stop date have been inputted and accepted, inputted time period is verbally repeated to the subscriber, e.g. "Confirm that requested time period is from Jun. 15, 1996 until Jun. 30, 1996 by depressing 1, and if incorrect, depress 2".

Should the subscriber choose not to accept received information relating to time period, i.e. in this particular case depress 2, the subscriber once more receives the initial message requesting a starting date.

When accepted by the subscriber, in this particular case by depressing 1, an available telephone number is fetched, which is passed on to the subscriber with a request for repeating from the keypad of the telephone. Should the number be repeated incorrectly, the subscriber is once more informed of allocated telephone number, with a repeated request for repetition.

A final message is only given when the subscriber has correctly punched in allocated telephone number via the keypad of the telephone, and same may include a repeated message relating to time period and allocated telephone number.

The allocated telephone number is connected for incoming calls to the telephone of the subscriber during programmed time period, and facilitates thus access to the telephone of the subscriber, preferably in parallel with the conventional telephone number.

The temporary telephone number results advantageously in a ring signal having different ring characteristics than normal also different "call waiting"characteristics are possible, e.g. alternating long and short ring signals, only short ring signals, two short followed by a long ring signal or any other easily distinguishable ring signal. As a result, the subscriber receives before replying an indication whether or not it is a conventional telephone call to the ordinary number of the subscriber, or if it is somebody trying to establish contact via the temporary telephone number.

In many cases, it is desirable to restrict incoming calls to only a certain period of the day or night, e.g. only evenings between 18.00 and 21.00. For example, hereby the risk for unauthorized calls during the night are avoided. Such a function can be accomplished by adding to what has been described above with reference to FIG. 1 that which is disclosed in FIG. 2, for example added to the steps shown in FIG. 1 at the indication (FIG. 2).

Figure 2:
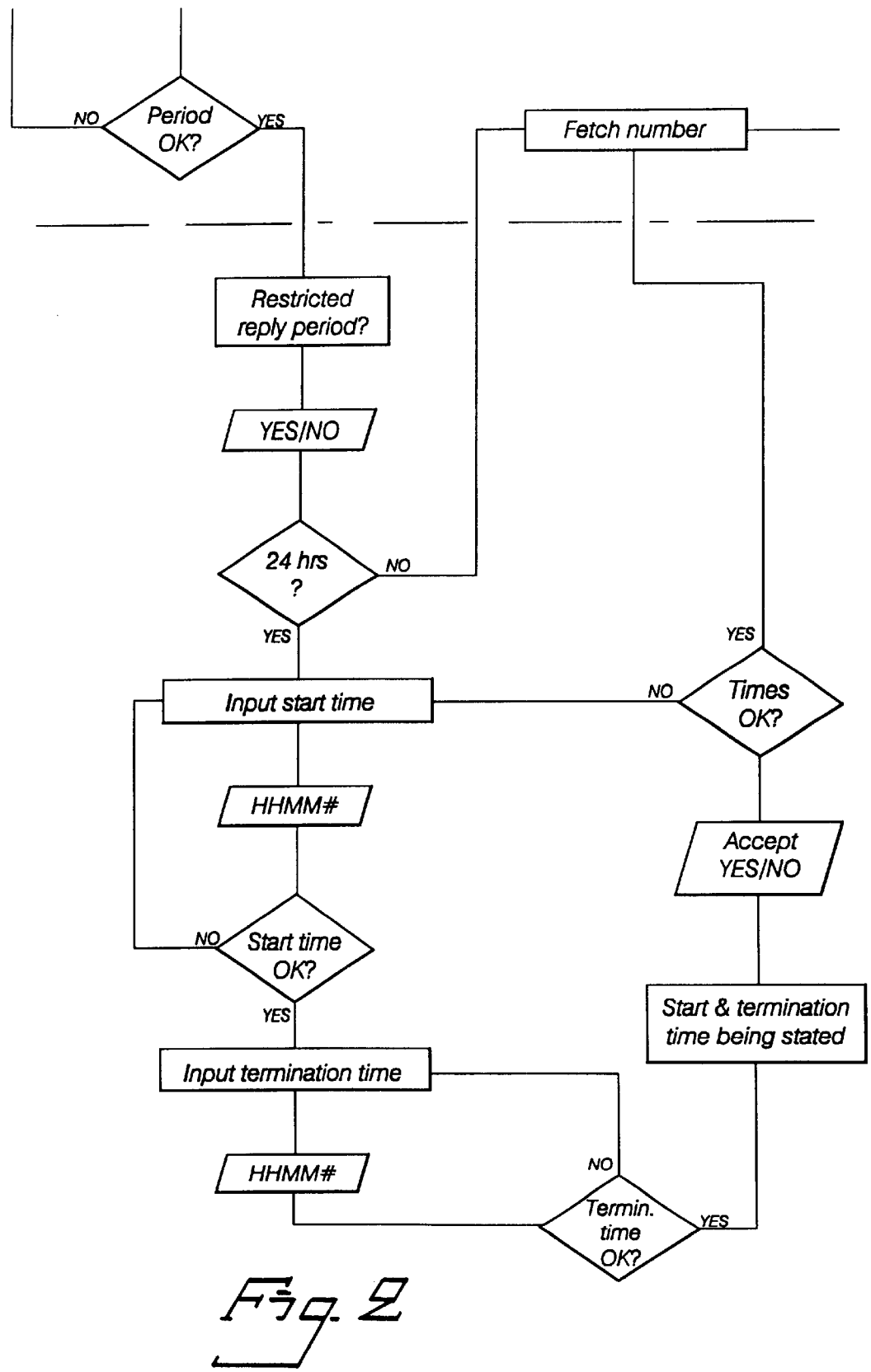
FIG. 2 is a flow chart showing an example of an additional sequence, intended to facilitate restriction of the time period within a twenty-four hour period as the temporary subscriber number is available, for example being an additional part of the flow chart in FIG. 1 which is marked (FIG. 2)

According to the modification shown in FIG. 2, the subscriber initially receives a question whether or not a restricted reply period is desirable. The subscriber can respond by the alternatives "yes/no", for example by depressing "1" for yes and by depressing "2" for no. Inputted response is interpreted in such a way, that the no-alternative results in return to the flow chart according to FIG. 1 ("fetch number"). However, should the subscriber choose the alternative "yes", a verbal message is received requesting input of starting time in the format hours/minutes (HHMM#). Input is advantageously terminated as shown by "#". Checking is thereafter carried out whether or not the starting time has been stated in correct format and thus acceptable, and should this not be the case, previously mentioned request for starting time with successively following input operation is repeated.

When a correct starting time has been punched in, the subscriber receives a verbal request for termination time, which is checked after completed input, and incorrect input results in a repeated request for termination time and a successively following input operation. When the termination time also has been punched in and accepted, the subscriber receives, preferably as shown, a verbal message comprising requested starting and termination time, which can be accepted or rejected by the subscriber by means of a yes-no-alternative (e.g. by the digit "1" indicating "yes" and the digit "2" indicating "no").

Should the message related to inputted starting and stopping time be rejected, the above described sequence is advantageously repeated as from previously mentioned request for a starting time.

However, should the message related to inputted times be accepted, reference is now made to the flow chart according to FIG. 1, i.e. to the function fetch number.

Apart from what has been described above, a subscriber may also find it desirable to make a prior interruption of requested service with a temporary telephone number, e.g. when an advertisement has resulted in sale of advertised goods.

Figure 3:
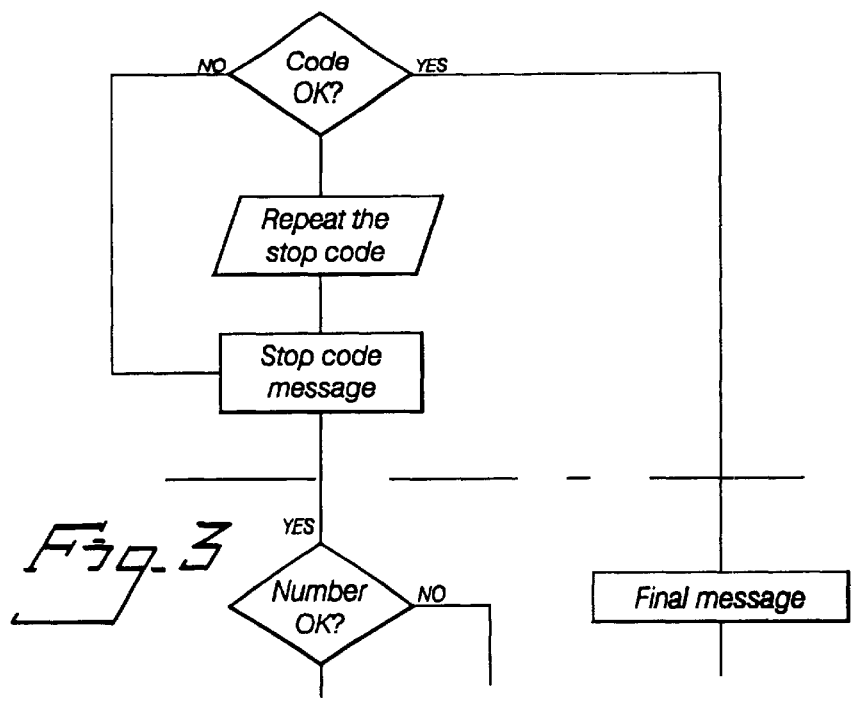
FIG. 3 is a flow chart showing an example of an additional sequence, intended to facilitate possibility of early disconnection of the temporary subscriber number, for example being an additional part of the flow chart in FIG. 1 which is marked (FIG. 3)

An example of such a modification is shown in FIG. 3, and may advantageously be incorporated in the flow chart of FIG. 1 at the region marked as (FIG. 3).

According to FIG. 3, the subscriber receives, after confirming acceptance of the temporary telephone number as received, also a stop code, comparable to a "pin code", e.g. a group of four digits. Such a message should preferably, as shown, be repeated by depressing a corresponding sequence of digits on the telephone of the subscriber, and an incorrectly punched in sequence of digits results in repetition of the message (followed by a repeated input operation from the subscriber). When the sequence of digits has been repeated correctly, return may, for example, as shown be performed before "final message" by the steps shown in FIG. 1.

The received code may be used for prior disconnection of the temporary telephone number, e.g. the subscriber calls a termination number and inputs the temporary telephone number followed by obtained digit sequence for termination, possibly with the telephone number and the digit sequence separated, initiated and or terminated by e.g. "*" or "#". It may also be offered, in a corresponding way, possibility to extend the time; change time zone, close the normal number for some time for incoming calls (while optionally maintaining the temporary one), etc.

The above and with reference to FIGS. 1–3 described example of an embodiment, and modifications thereof, can obviously be changed in a number of ways, e.g. by changing the order for described functions; small changes with regard to checking functions; the ordering method of the subscriber and/or response to requested information; ordering and/or allocation of number may be in writing, via computer communication or via telecopier; the allocated number is a short code, alphanumerical or verbal address; the subscriber can influence the number characteristics, etc.

The temporary telephone numbers which are used according to the invention may either comprise all available numbers within a call area, or a certain number sequence which is not used as normal telephone numbers. In the latter case, such a sequence of numbers can be made independent of call areas, while in the first case mentioned call charging normally is made more simple for the telephone company in question. The subscriber may also be offered the possibility of choosing if a "020 number" or similar (without or with only one call unit being charged the calling party) should be given, and will then himself accept charges of any additional call charges, e.g. for long distance calls. An advantageous form at for this for small shops, special occasions, sales etc. and where anonymity is not a concern, could be just adding the "020" prefix/status to the normal number (possibly inclusive of area code) for requested time, time zones etc. (while optionally maintaining also the "normal" number for incoming calls), and thus not at all having to advertise a new "unknown" telephone number for the occasion but only inform about the "020" facility to desired clientele, and also being given this facility only when needed and not having to pay constantly for permanent "020"subscription, non-business-hours-calls, night time faxes and junk (e-)mail etc. Also, it could be advantageous and useful to decide by caller category rather than just temporal criterias which calls should be treated as a temporary number call, for instance by ordering that only local numbers should thus be allowed by night.

Figure 4:
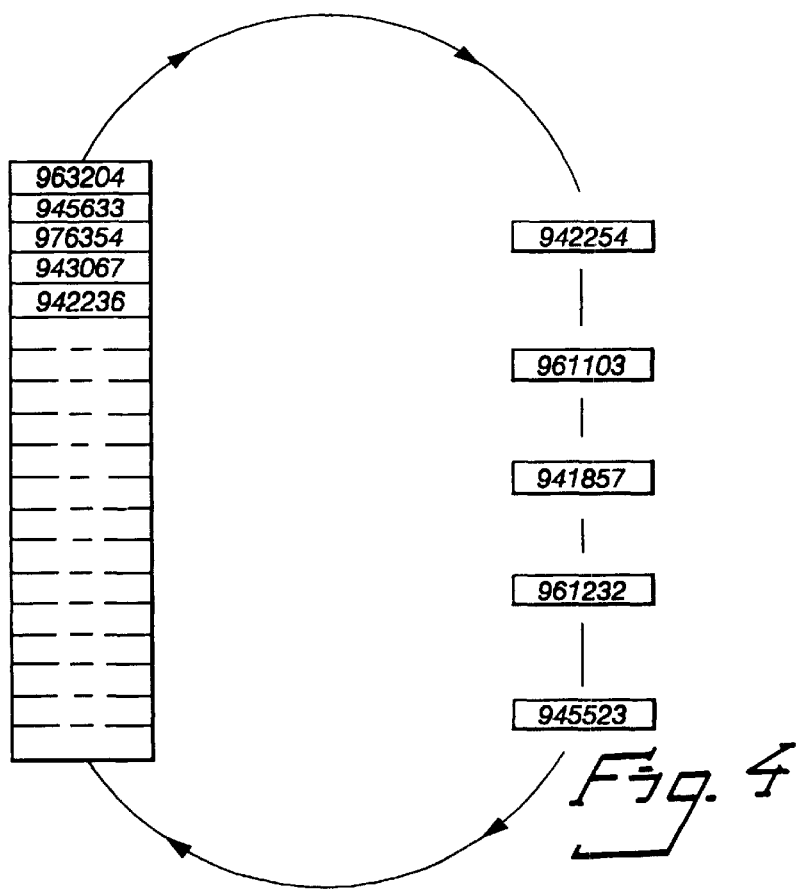
FIG. 4 is a view intended to show how temporary subscriber numbers are fetched from a stack with available subscriber numbers, and how temporary subscriber numbers after use are placed at the bottom of the stack.

In most described all these cases, available telephone numbers are advantageously arranged in a "stack", new temporary telephone numbers being fetched from one side, whereas allocated telephone numbers after use being added at the opposed side of the storage medium, i.e. according to the principle "first in-last out". This principle is schematically shown in FIG. 4.

This results in the advantage, that a used telephone number is not reused again during a relatively long period of time, i.e. there is minimum risk that a subscriber receives calls related to a previous subscriber. A further advantageous use of a temporary number according to the present invention is that one can give, for example, roommates, teenagers, guests etc. such a number (and which could be listed) in addition to ones own normal number (possibly secret/unlisted), thus maintaining the integrity of the latter and creating a virtual "extra line" facility. These different numbers can also advantageously independent of each other reply decide whether to accept or not in telemarketing, "free phone" (advertisement) and similar types of calls, if and when such options are available.

The method according to the present invention also offers large economical advantages to the telephone company administrating the telephone network, since unused telephone numbers become used and cause an increased call frequency, and since the calling party is also debited a call charge, and the subscriber using the service can be debited for the time period in which a temporary telephone number is used. Furthermore, the service is easily implemented in modern computer based telephone exchanges without requiring any personnel resources to maintain the service. The method can obviously also be used in connection with more simple types of telephone exchanges, as well as external exchanges in relation to the telephone company, for example by addition of supplementary equipment handling the functions described above. The service can obviously also be carried out manually by use of a telephone operator who requests previously mentioned information and gives out relevant information, and who also implements connection and disconnection of allocated temporary telephone number. However, this means considerable increases in costs for utilizing the invention. Alternatively, one can be given (by the telephone company or advertising/transferring company) an individual code number, possibly with a special "area code number" (for example a 071-number with the code supplied added as a suffix), which can be stated in the advertisement and dialed by the person who wishes to reply to the advertisement. This number can be secretly transformed into the conventional number of the advertising party, to which connection is carried out automatically. This can be offered by both external (the advertising/transferring company, which receives income when the 071-number of same is being used) as internal (the telephone company) exchanges, and results in an easily understandable modification of the preferred and herein described embodiment of the invention and which could also immediately provide mobile phones, pagers etc. with the service without having to alter their on-board ID-chips/cards.

With regard to the modification previously described with reference to FIG. 2, same may advantageously be further modified in such a way that a calling subscriber receives a verbal message during the time period when the temporary telephone number does not result in a call to the subscriber. Such a message may for example be: "We ask you to call again between 18.00 and 21.00". Such a modification increases the service level further and each such call also result in call charge possibility for the telephone company. Also verbal informed telephone queuing may be incorporated, as well as information disclosing that the call has been made to early, e.g. with regard to date, etc.

An allocated temporary telephone number should preferably be maintained secret, i.e. without disclosure of the name and/or address of the subscriber by means of a customary number enquiry. Furthermore, an allocated temporary telephone number may advantageously also offer a subscriber conventional services, such as "follow-me diversion", "call forwarding on no reply", "disclosure of calling number", "call waiting " and similar. On the other hand, all outgoing calls from the subscriber are preferably made using and charging the conventional number of the subscriber. The service can without any difficulties be charged on the conventional telephone bill of the subscriber based on the fact that a request for the service has been made from the normal telephone number or with individual address information, and by stating desired time period for the temporary telephone number. When prior termination occurs, as previously discussed with reference to FIG. 3, the information relating to period of use can be automatically amended for the correct charge.

The functions required to use the method according to the present invention are already available in modern computer controlled telephone exchanges, and thus only require adapted software, which can be carried out by a person skilled in the art on basis of the present disclosure.

Shown and described embodiment, and modifications thereof, only intend to serve as a non-restricting example within the scope of the inventive thought and the following claims, and may thus be further modified within the scope of the following claims. As example may information such as allocated temporary telephone number, termination code, ordered time period and time interval each twenty-four hour period when the temporary telephone number is open for incoming calls, also be communicated in writing by letter to the subscriber, either as a substitute for previously mentioned verbal messages in connection with an ordering operation or as a confirmation of completed order and given verbal messages. Also, in some instances, a "dry" temporary number might be desired for longer periods, activating and deactivating the "wet" service function from time to time by specific commands given by the subscriber. The method according to the present invention can also be offered completely or in separate aspects by different and from the telecommunication administration independent providers, as well as used in communication via PC/modem, telephone communication and communication via closed circuit TV nets, telecopier communication, pagers mobile telephone communication, ISDN, radio/satellite electricity wiring telephone communication, etc, and for connections to Internet, whereby a possibility can be offered for obtaining "high priority" numbers/addresses. Such a number for connection to Internet can be given for a certain time period, and ensure complete security for a successful dialed connection to Internet (or any other computer network) for completion with maximum security. The e-mail address of the user can also during desired time period be moved to a mail server with low work load, accessible via normal or a special number, in order to secure possibility to send/receive urgent e-mail also during high intensity traffic periods, preferably according to stipulated policy/authorization criteria. Scientist, doctors and other professional users can hereby be offered communication security even during the hours when trivial traffic overload the dial-in modem pools connected to the computer network. A user can obviously also in the same way obtain a temporary address during a predetermined period of time, which can be communicated to colleagues and others with whom communication is given priority. Combinations of above discussed examples can also be implemented.

What is claim is:

1. A telephoning method comprising the steps of:
    offering at least one subscriber of a plurality of subscribers of a telephone network/telecommunication system a service for incoming calls/communication;
    connecting by said at least one subscriber, by means of dial-up and/or input through an existing keypad at a telephone instrument/terminal of the at least one subscriber, to the telephone network/telecommunication system for starting the ordering operation;
    inputting by said at least one subscriber a predetermined booking number/code and/or in writing/verbally;
    inputting by said at least one subscriber a desired time period, and said desired time period having a starting date and an ending date for a required connectable temporary telephone number/address;
    providing to said at least one subscriber upon completed ordering operation a verbal/alphanumerical message related to allocated temporary telephone number/address, which during the time period facilitates incoming calls/communication, without influencing the possibility of incoming and outgoing calls/communication with use of the normal telephone number/address of the subscriber.

2. The telephoning method according to claim 1, comprising the steps of:
    stating by said at least one subscriber, apart from start and ending date, a time interval within a twenty-four hour period; and
    switching only incoming calls through to the temporary telephone number during said time interval.

3. The telephoning method according to claim 2, further comprising the steps of:
    providing a verbal message for indicating that connecting operations intended for the temporary telephone number during time periods outside predetermined time interval for the telephone number cannot be reached at present; and
    stating the time period during which connection to the subscriber is permitted.

4. The telephoning method according to claim 1, wherein said step of inputting of data related to desired use of the temporary telephone number is made on basis of received verbal messages; and
    checking is performed on validity of inputted information, and that unaccepted inputted information results in a repeated request for information, followed by repeated input and checking.

5. The telephoning method according to claim 1, further comprising the step of:
    obtaining for said at least one subscriber after input of desired use for the temporary telephone number information relating to allocated temporary telephone number as a verbal message and/or as a written confirmation by mail.

6. The telephoning method according to claim 1, further comprising the steps of:
    receiving for said at least one subscriber after accepted input of data relating to desired features for the use of the temporary telephone number information relating to at least a multi-digit cancellation code; and
    facilitating after connection to a predetermined telephone number, and in conjunction with allocated temporary telephone number, cancellation of the temporary telephone number service prior to the end of a previously stated time period.

7. The telephoning method according to claim 1, further comprising the step of:
    providing ring signals indicating calls through allocated temporary telephone number have ring characteristics different from ring signals indicating a call through the ordinary telephone number of the subscriber.

8. The telephoning method according to claim 1, wherein said utilized temporary telephone numbers comprises of available vacant telephone numbers within the call area of the subscriber or a number series dedicated for the purpose; and
    allocating the temporary telephone numbers from such a bank of numbers according to the principle "first out-last in" whereby the time period before reusing a telephone number is maximized.

9. The telephoning method according to claim 1, wherein said utilized temporary telephone numbers facilitate use of additional services programmable by the subscriber, consisting of follow-me diversion, call forwarding on no reply, three-party conference calls, "call waiting" and similar.

10. The telephoning method according to claim 1, further comprising the step of:
    allocating for "Internet" and similar applications the temporary telephone number/address according to certain status criteria and giving a higher degree of priority than the conventional telephone number/address.

11. The telephoning method according to claim 1, further comprising the steps of:
    allocating temporary/occasional "020"-status; and
    maintaining the already existing subscriber number/address.

12. The telephoning method according to claim 1, further comprising the step of:
    requesting temporary number/address by caller category than mere temporal criterias.

* * * * *